(12) United States Patent
Iwasaki et al.

(10) Patent No.: US 11,280,624 B2
(45) Date of Patent: Mar. 22, 2022

(54) CONTROL DEVICE, CONTROL SYSTEM, MOVABLE OBJECT, CONTROL METHOD, AND PROGRAM

(71) Applicant: MITSUBISHI HEAVY INDUSTRIES, LTD., Tokyo (JP)

(72) Inventors: Satoshi Iwasaki, Tokyo (JP); Koji Uchida, Tokyo (JP); Hiroyuki Kono, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 143 days.

(21) Appl. No.: 16/010,849

(22) Filed: Jun. 18, 2018

(65) Prior Publication Data

US 2018/0364056 A1    Dec. 20, 2018

(30) Foreign Application Priority Data

Jun. 19, 2017    (JP) .............................. JP2017-119675

(51) Int. Cl.
*G01C 21/34* (2006.01)
*G01C 21/36* (2006.01)
*G08G 1/0968* (2006.01)
*G08G 1/0969* (2006.01)
*G09B 29/10* (2006.01)

(52) U.S. Cl.
CPC ....... *G01C 21/3415* (2013.01); *G01C 21/367* (2013.01); *G08G 1/0969* (2013.01); *G08G 1/096844* (2013.01); *G08G 1/096855* (2013.01); *G09B 29/10* (2013.01)

(58) Field of Classification Search
CPC .............. G01C 21/3415; G01C 21/367; G01C 21/34–3492; G09B 29/10; G08G 1/0969; G08G 1/096844; G08G 1/096855; G08G 1/096822
USPC ......................................................... 701/533
See application file for complete search history.

(56) References Cited

U.S. PATENT DOCUMENTS

| 5,874,905 A | * | 2/1999 | Nanba | ................ | G01C 21/3635 |
| | | | | | 340/988 |
| 5,892,463 A | * | 4/1999 | Hikita | ................ | G01C 21/3492 |
| | | | | | 340/905 |
| 6,101,443 A | | 8/2000 | Kato et al. | | |

(Continued)

FOREIGN PATENT DOCUMENTS

| JP | 8-50027 | 2/1996 |
| JP | 10-281790 | 10/1998 |

(Continued)

*Primary Examiner* — Fadey S. Jabr
*Assistant Examiner* — Mohamed Abdo Algehaim
(74) *Attorney, Agent, or Firm* — Wenderoth, Lind & Ponack, L.L.P.

(57) ABSTRACT

A movable object position determining unit of a control device for a movable object is configured to determine whether a current position of the movable object is separated a predetermined distance or more from a transit point which is a junction between a valid movement track and a candidate movement track. A change processing unit is configured to change the candidate movement track as a new valid movement track when a track change determining unit determines that the current position of the movable object is separated the predetermined distance or more from the transit point as the junction.

13 Claims, 9 Drawing Sheets

(56) References Cited

U.S. PATENT DOCUMENTS

| | | | | |
|---|---|---|---|---|
| 6,253,146 B1* | 6/2001 | Hanson | G01C 21/3415 | 340/905 |
| 7,319,931 B2* | 1/2008 | Uyeki | G01C 21/3415 | 701/117 |
| 8,036,820 B2* | 10/2011 | Sera | G08G 1/096827 | 701/117 |
| 8,532,922 B2* | 9/2013 | Wartenberg | G01C 21/367 | 370/329 |
| 2003/0236616 A1* | 12/2003 | Kawakami | G01C 21/3632 | 701/468 |
| 2006/0089787 A1* | 4/2006 | Burr | G01C 21/3469 | 701/533 |
| 2006/0229806 A1* | 10/2006 | Forlenza | G01C 21/3484 | 701/411 |
| 2007/0156334 A1* | 7/2007 | Vu | G01C 21/3415 | 701/416 |
| 2008/0004802 A1* | 1/2008 | Horvitz | G01C 21/3415 | 701/533 |
| 2008/0086269 A1* | 4/2008 | Joe | B60W 30/09 | 701/301 |
| 2008/0162041 A1* | 7/2008 | Nakamura | G01C 21/32 | 701/533 |
| 2008/0275640 A1* | 11/2008 | Yun | G01C 21/3492 | 701/533 |
| 2009/0234577 A1* | 9/2009 | Rinscheid | G01C 21/3415 | 701/533 |
| 2009/0281721 A1* | 11/2009 | Yoshioka | G01C 21/3415 | 701/414 |
| 2010/0023254 A1* | 1/2010 | Machino | G01C 21/36 | 701/533 |
| 2010/0198443 A1* | 8/2010 | Yabushita | G05D 1/0274 | 701/25 |
| 2010/0205060 A1* | 8/2010 | Athsani | G01C 21/3484 | 705/14.58 |
| 2010/0223001 A1* | 9/2010 | Sugawara | G01C 21/3694 | 701/533 |
| 2010/0256903 A1* | 10/2010 | Johnson | G01C 21/32 | 701/533 |
| 2010/0312466 A1* | 12/2010 | Katzer | G01C 21/3492 | 701/533 |
| 2011/0276265 A1* | 11/2011 | Husain | G01C 21/3461 | 701/533 |
| 2011/0282575 A1* | 11/2011 | Masuda | G01C 21/32 | 701/533 |
| 2011/0282576 A1* | 11/2011 | Cabral | G01C 21/3492 | 701/533 |
| 2012/0303266 A1* | 11/2012 | Su | G01C 21/3476 | 701/420 |
| 2013/0245945 A1* | 9/2013 | Morita | G08G 1/096716 | 701/533 |
| 2014/0058671 A1* | 2/2014 | Ichikawa | G01C 21/3694 | 701/533 |
| 2014/0277894 A1 | 9/2014 | Doyle et al. | | |
| 2015/0019127 A1* | 1/2015 | Pritchard | G01C 21/367 | 701/423 |
| 2015/0066355 A1* | 3/2015 | Siegel | G01C 21/3446 | 701/410 |
| 2015/0253144 A1* | 9/2015 | Rau | G01C 21/3415 | 705/348 |
| 2015/0345968 A1* | 12/2015 | Wang | G01C 21/32 | 701/533 |
| 2016/0076899 A1* | 3/2016 | Macneille | G01C 21/3667 | 701/428 |
| 2016/0113565 A1* | 4/2016 | Lee | A61B 5/486 | 701/533 |
| 2016/0131496 A1* | 5/2016 | Beaurepaire | G01C 21/3676 | 701/410 |
| 2017/0059351 A1* | 3/2017 | Kawamukai | G01C 21/3461 | |
| 2018/0173223 A1* | 6/2018 | Doane | B60W 30/08 | |
| 2018/0174449 A1* | 6/2018 | Nguyen | G08G 1/0104 | |
| 2018/0319380 A1* | 11/2018 | Laine | B60W 10/184 | |
| 2018/0336007 A1* | 11/2018 | Li | G06F 3/167 | |
| 2019/0027036 A1* | 1/2019 | Mishina | B60W 30/09 | |
| 2020/0201353 A1* | 6/2020 | Martin | G05D 1/0276 | |

FOREIGN PATENT DOCUMENTS

| | | |
|---|---|---|
| JP | 2009-121876 | 6/2009 |
| JP | 2016-514026 | 5/2016 |

* cited by examiner

120
CONTROL DEVICE, CONTROL SYSTEM, MOVABLE OBJECT, CONTROL METHOD, AND PROGRAM

CROSS-REFERENCE TO RELATED APPLICATION

Priority is claimed from Japanese Patent Application No. 2017-119675, filed Jun. 19, 2017, the content of which is incorporated herein by reference.

TECHNICAL FIELD

The invention relates to a control device, a control system, a movable object, a control method, and a program.

BACKGROUND ART

Various techniques for controlling a movable object such as a vehicle which moves to a destination along a predetermined movement track are known. For example, Japanese Unexamined Patent Application, First Publication No. 2009-121876 discloses a navigation system that guides a vehicle along a movement track to a destination in an off-road zone. JP 2009-121876 also discloses a technique for performing re-guidance for a movement track avoiding passage disturbing factors such as fallen rocks or submergence due to floods when such passage disturbing factors have occurred in the movement track in an off-road zone.

SUMMARY OF INVENTION

Technical Problem

However, in the technique described in JP 2009-121876, there is a problem in that a movable object such as a vehicle cannot necessarily move smoothly along a new movement track for which re-guidance is performed. For example, when a direction of a new movement track for which re-guidance is performed has a large angle with respect to a current moving direction and a movable object changes its moving direction to move along the new movement track, there is a likelihood that the movable object will not be able to turn at an intersection or the like, but depart from the new movement track and cause an unexpected accident.

When a movable object such as a vehicle is automatically driven, it is necessary to secure safe movement by temporarily stopping and then changing a movement track to a new movement track or the like, which is very inefficient. Accordingly, there is requirement for a movable object control technique that can provide a safe and efficient movement track.

An objective of the invention is to provide a control device for a movable object, a control system, a movable object, a control method, and a program that can cause the movable object such as a vehicle moving along a movement track to a destination to safely and efficiently travel to the destination.

Solution to Problem

According to a first aspect of the invention, there is provided a control device for a movable object moving along a movement track which is constituted by connecting a plurality of transit points set in a space, the control device including: a track change determining unit that is configured to determine whether a valid movement track which is the movement track along which the movable object is scheduled to move needs to be changed; a candidate track specifying unit that is configured to specify a candidate movement track which is the movement track other than the valid movement track when it is determined that the valid movement track needs to be changed; a movable object position determining unit that is configured to determine whether a current position of the movable object is separated a predetermined distance or more from a transit point which is a junction between the valid movement track and the candidate movement track; and a change processing unit that is configured to change the candidate movement track as a new valid movement track when it is determined that the current position of the movable object is separated the predetermined distance or more from the transit point serving as the junction.

According to a second aspect of the invention, the control device according to the first aspect may further include an update processing unit that is configured to update the valid movement track when the movable object has reached the transit point of the valid movement track and the movable object has not reached a destination.

According to a third aspect of the invention, in the control device according to the second aspect, the track change determining unit may be configured to determine whether the valid movement track needs to be changed again when the valid movement track has been updated.

According to a fourth aspect of the invention, in the control device according to any one of the first to third aspects, the predetermined distance may be defined in advance as a distance that the movable object passing through the transit point that is the junction is able to travel without stopping.

According to a fifth aspect of the invention, in the control device according to the fourth aspect, the predetermined distance may be defined in advance as a value based on a current moving speed of the movable object.

According to a sixth aspect of the invention, in the control device according to any one of the first to third aspects, the change processing unit may be configured to change the candidate movement track in which a change angle of a moving direction of the movable object at the junction is minimized as a new valid movement track when a plurality of candidate movement tracks are specified by the candidate track specifying unit.

According to a seventh aspect of the invention, in the control device according to any one of the first to sixth aspects, the movable object may be a vehicle.

According to an eighth aspect of the invention, in the control device according to any one of the first to sixth aspects, the movable object may be a ship.

According to a ninth aspect of the invention, in the control device according to any one of the first to sixth aspects, the movable object may be an aircraft.

According to a tenth aspect of the invention, in the control device according to any one of the first to sixth aspects, the movable object may be an underwater craft.

According to an eleventh aspect of the invention, there is provided a control system including: the control device according to any one of the first to tenth aspects; and the movable object, wherein the control device includes a movable object information receiving unit that is configured to receive movable object information including position information, speed information, and moving direction information of the movable object from the movable object, and a route information transmitting unit that is configured to transmit route information including information of the valid movement track to the movable object, and wherein the movable object includes an information transmitting unit that is configured to transmit the movable object information to the control device, an information receiving unit that is configured to receive the route information from the control device, and a traveling control unit that is configured to control traveling of the movable object on the basis of the received route information.

According to a twelfth aspect of the invention, there is provided a movable object including the control device according to any one of the first to tenth aspects.

According to a thirteenth aspect of the invention, there is provided a control method for a movable object moving along a movement track which is constituted by connecting a plurality of transit points set in a space, the control method including: a track change determining step of determining whether a valid movement track which is the movement track along which the movable object is scheduled to move needs to be changed; a candidate track specifying step of specifying a candidate movement track which is the movement track other than the valid movement track when it is determined that the valid movement track needs to be changed; a movable object position determining step of determining whether a current position of the movable object is separated a predetermined distance or more from a transit point which is a junction between the valid movement track and the candidate movement track; and a change processing step of changing the candidate movement track as a new valid movement track when it is determined that the current position of the movable object is separated the predetermined distance or more from the transit point serving as the junction.

According to a fourteenth aspect of the invention, there is provided a program causing a computer that is a control device for a movable object moving along a movement track which is constituted by connecting a plurality of transit points set in a space to serve as: a track change determining unit that is configured to determine whether a valid movement track which is the movement track along which the movable object is scheduled to move needs to be changed; a candidate track specifying unit that is configured to specify a candidate movement track which is the movement track other than the valid movement track when it is determined that the valid movement track needs to be changed; a movable object position determining unit that is configured to determine whether a current position of the movable object is separated a predetermined distance or more from a transit point which is a junction between the valid movement track and the candidate movement track; and a change processing unit that is configured to change the candidate movement track as a new valid movement track when it is determined that the current position of the movable object is separated the predetermined distance or more from the transit point serving as the junction.

Advantageous Effects of Invention

According to at least one of the above-mentioned aspects, it is possible to cause a movable object such as a vehicle moving along a movement track to a destination to safely and efficiently travel to the destination.

DESCRIPTION OF EMBODIMENTS

First Embodiment

Hereinafter, embodiments of the invention will be described in detail with reference to the accompanying drawings.

Figure 1:
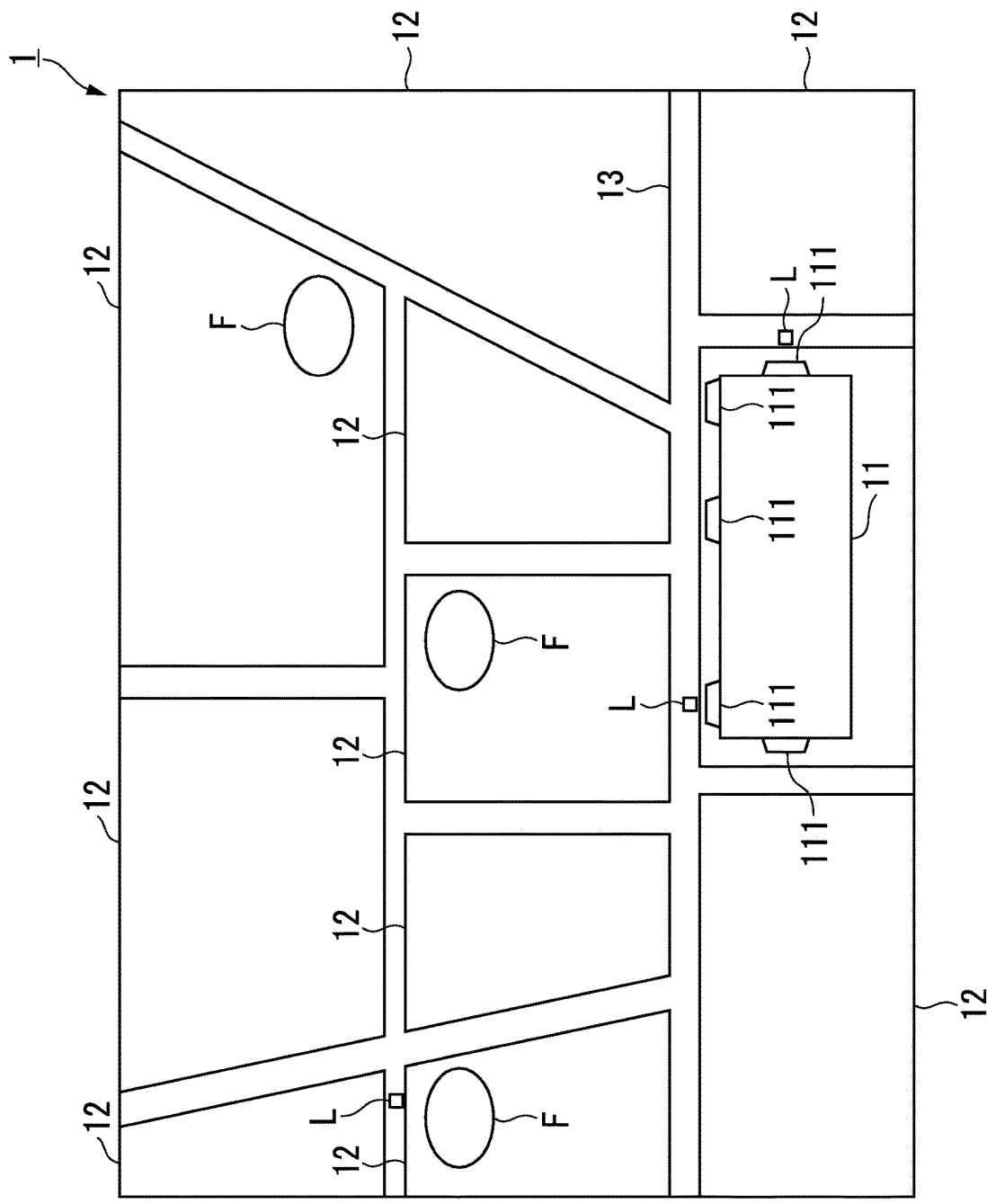
FIG. 1 is a diagram illustrating an outline of a facility including a control system according to a first embodiment.

FIG. 1 is a diagram schematically illustrating an outline of a facility including a control system according to a first embodiment of the invention.

A control system 2 according to the first embodiment is provided in a waiting facility 1. That is, the waiting facility 1 according to the first embodiment is an example of a facility including the control system 2. A terminal building 11, waiting areas 12, and roads 13 disposed between the terminal building 11 and the waiting areas 12 are provided in the waiting facility 1. The terminal building 11 is a facility in which a passenger boarding a transportation machine F implements a procedure. A plurality of gates 111 adjacent to the roads 13 are installed in the terminal building 11. Each gate 111 authenticates a ticket or the like possessed by a passenger and identifies the name and flight number of the passenger. The waiting area 12 is a space in which the transportation machine F waits. Examples of the transportation machine F include a ship and an aircraft. Examples of the waiting facility 1 include a harbor and an airport.

In the waiting facility 1, passengers are transported between the terminal building 11 and the waiting areas 12 by a transportation vehicle L included in the control system 2. The control system 2 controls traveling of the vehicle L. The gates 111 for the vehicle L are provided in the terminal building 11.

Figure 2:
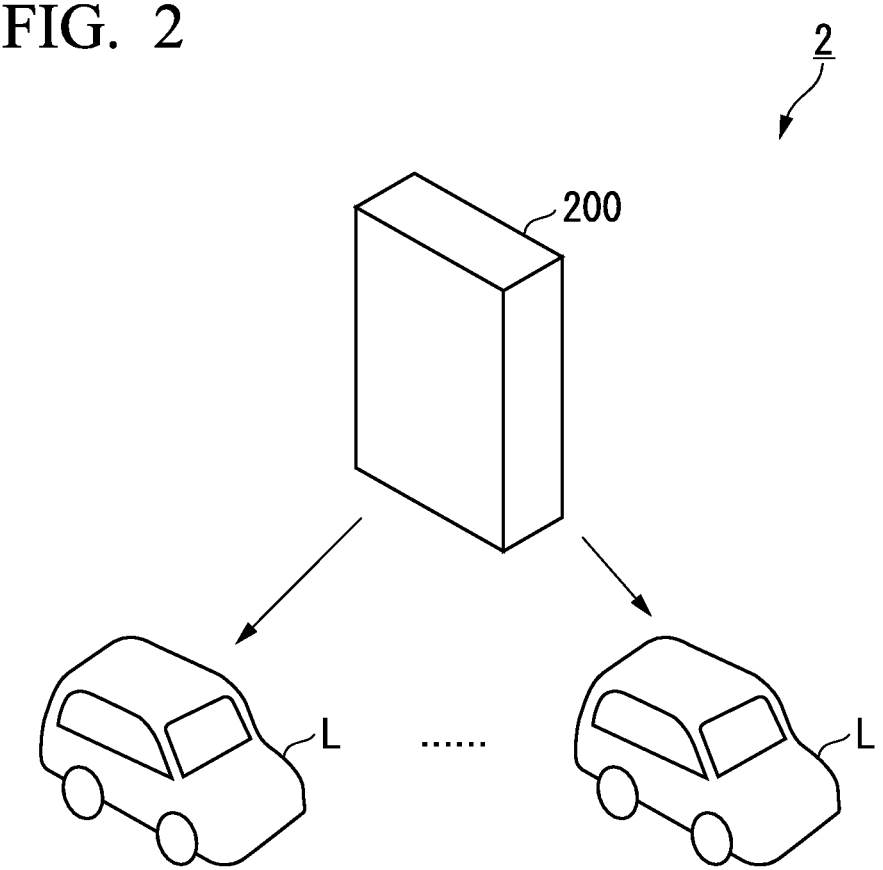
FIG. 2 is a diagram schematically illustrating the control system according to the first embodiment.

FIG. 2 is a diagram schematically illustrating a configuration of the control system according to the first embodiment.

The control system 2 includes a plurality of vehicles L as movable objects and a movable object managing device 200 as a control device for the vehicles L. The control system 2 is connected to a boarding management system which manages operation of an airport and which is not illustrated and a gate system which manages passengers passing through the gates 111 of the terminal building 11 and which is not illustrated via a network.

Each vehicle L has a route from a departure point to a destination set therein and travels automatically from the departure point to the destination. For example, the vehicle L boards passengers at the gates 111 of the terminal building 11 that is the departure point and moves to a waiting area 12 that is the destination on the basis of information of a valid movement track included in route information transmitted from the movable object managing device 200. Here, a movement track is a track along which a movable object moves and which is constituted by virtually setting a plurality of transit points in a space and linearly connecting the plurality of transit points. In the first embodiment of the invention, a transit point WP is set for each intersection on the roads 13 which are disposed on the ground which is a two-dimensional space. For example, a transit point WP may be disposed at the central position of each intersection. A valid movement track is a movement track which is transmitted from the movable object managing device 200 to the vehicle L and set in advance therein and is a movement track along which the vehicle L is scheduled to move. The vehicle L moves to the destination by sequentially passing through the transit points WP included in the valid movement track. The departure point and the destination of the vehicle L may be designated if necessary.

Figure 3:
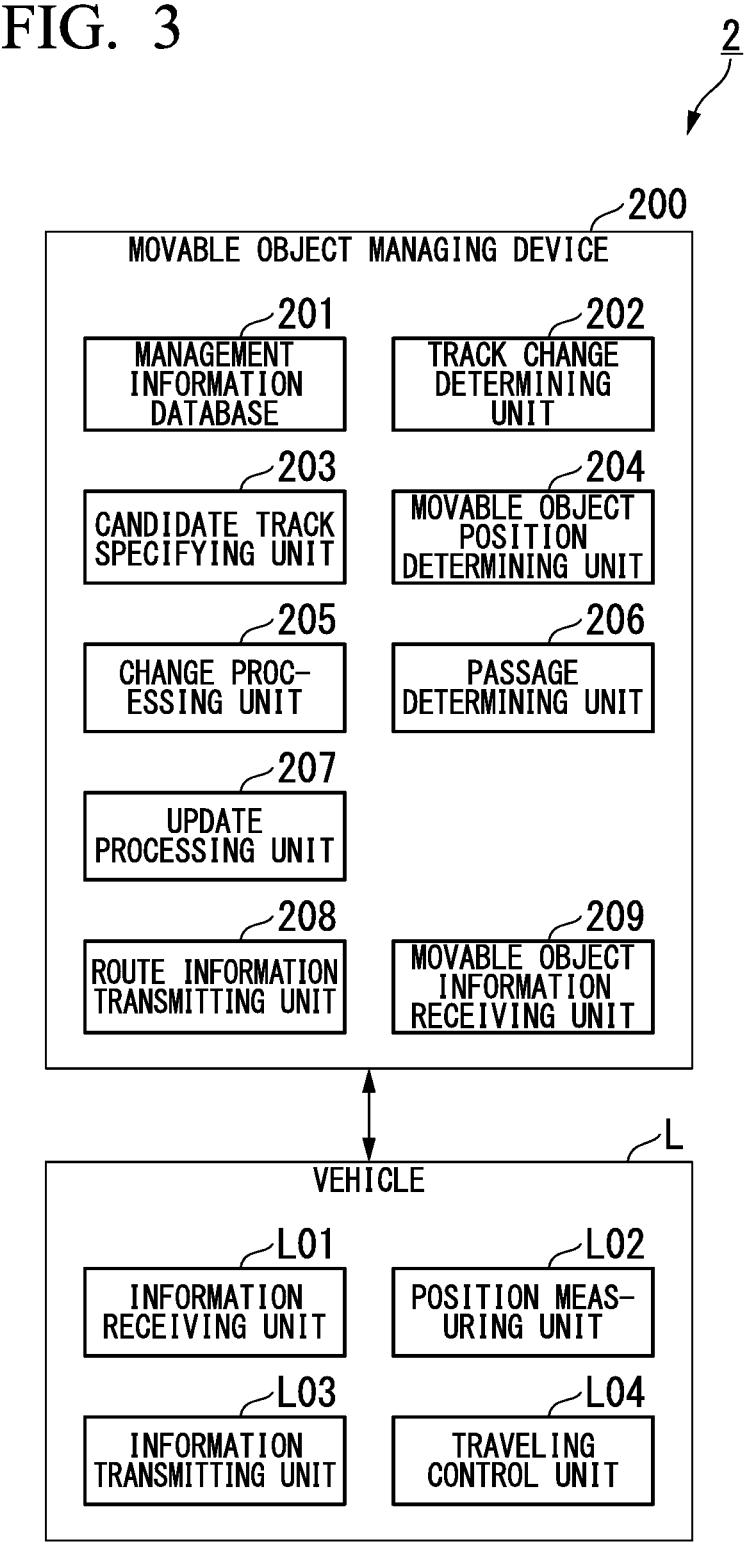
FIG. 3 is a block diagram schematically illustrating configurations of a movable object managing device and a vehicle according to the first embodiment.

FIG. 3 is a block diagram schematically illustrating a configuration of a vehicle and a movable object managing device according to the first embodiment of the invention.

A vehicle L includes an information receiving unit L01, a position measuring unit L02, an information transmitting unit L03, and a traveling control unit L04.

The information receiving unit L01 receives route information from the movable object managing device 200.

The position measuring unit L02 measures a position of the vehicle L. Specifically, the position measuring unit L02 measures the position by reading an identifier for reading position information installed in passages, using autonomous navigation using an axle rotation speed or the like, using a global navigation satellite system (GNSS), or the like. The position measuring unit L02 also measures a moving speed and a moving direction of the vehicle L on the basis of the measured position of the vehicle L.

The information transmitting unit L03 transmits movable object information including information of the position (position information) of the vehicle L, information of the moving speed (speed information), and information of the moving direction (moving direction information) of the vehicle L measured by the position measuring unit L02 to the movable object managing device 200.

The traveling control unit L04 controls the vehicle L such that the vehicle L travels along a valid movement track to the destination on the basis of the route information received by the information receiving unit L01 and the position information measured by the position measuring unit L02. For example, the traveling control unit L04 controls steering and the moving speed such that the vehicle L travels along the valid movement track on the basis of the route information. The traveling control unit L04 also controls acceleration and deceleration of the moving speed such that the position of the vehicle L does not depart from a predetermined allowable range on the basis of the current position and the current moving speed. The traveling control unit L04 stops the vehicle L when the current position of the vehicle L departs from the predetermined allowable range.

The movable object managing device 200 transmits route information to the vehicle L.

The movable object managing device 200 includes a management information database 201, a track change determining unit 202, a candidate track specifying unit 203, a movable object position determining unit 204, a change processing unit 205, a passage determining unit 206, an update processing unit 207, a route information transmitting unit 208, and a movable object information receiving unit 209.

The management information database 201 stores information for managing the vehicle L. Specifically, the management information database 201 stores identification information of the vehicle L, movable object information of the vehicle L (position information, speed information, and moving direction information of the vehicle L), map information including a road on which the vehicle L moves, transit point information including positions of a plurality of transit points which are set on the road, valid movement track information on a valid movement track set in the vehicle L, information of a candidate movement track which is a candidate for a movement track which is newly set as a valid movement track of the vehicle L, and information of an obstacle occurrence position when an obstacle such as congestion or an accident occurs. The management information database 201 may store other information required for the processing.

The valid movement track information may include information of the transit points through which the vehicle L is scheduled to pass in the passing order.

When congestion, an accident, or the like occurs at a certain position of the road 13 and an obstacle occurrence notification from an obstacle occurrence notifying unit (not illustrated) is received, the track change determining unit 202 determines whether the valid movement track set in the vehicle L needs to be changed with reference to the management information database 201. The track change determining unit 202 outputs the determination result to the candidate track specifying unit 203 when it is determined that the valid movement track set in the vehicle L needs to be changed, and inputs an instruction to start the processing to the passage determining unit 206 when it is determined that the valid movement track set in the vehicle L does not need to be changed.

When an instruction to continue the processing is input from the passage determining unit 206 or the update processing unit 207, the track change determining unit 202 determines whether the valid movement track set in the vehicle L needs to be changed with reference to the management information database 201 and outputs the determination result to the candidate track specifying unit 203.

When the track change determining unit 202 determines that the valid movement track needs to be changed and the determination result is input from the track change determining unit 202, the candidate track specifying unit 203 specifies a candidate movement track which is a movement track other than the valid movement track with reference to the management information database 201. The candidate track specifying unit 203 outputs the specified candidate movement track to the movable object position determining unit 204.

When the candidate movement track specified by the candidate track specifying unit 203 is input, the movable object position determining unit 204 determines whether the current position of the vehicle L is separated a predetermined distance or more from a transit point serving as a junction between the valid movement track set in advance in the vehicle L and the candidate movement track with reference to the management information database 201. Here, a transit point serving as a junction between the valid movement track and the candidate movement track is a final transit point which is common to both the valid movement track and the candidate movement track when the candidate movement track is traced in the moving direction of the vehicle L from the current position of the vehicle L. That is, a transit point subsequent to the transit point serving as the junction in the moving direction of the vehicle L differs in the valid movement track and the candidate movement track. The movable object position determining unit 204 outputs the determination result to the change processing unit 205 when it is determined that the current position of the vehicle L is separated the predetermined distance or more from the transit point serving as the junction, and outputs the determination result to the passage determining unit 206 when it is determined that the current position of the vehicle L is not separated the predetermined distance or more from the transit point serving as the junction.

When the determination result indicating that the current position of the vehicle L is separated the predetermined distance or more from the transit point serving as the junction is input from the movable object position determining unit 204, the change processing unit 205 stores the candidate movement track as a new valid movement track in the management information database 201 with reference to the management information database 201, changes the candidate movement track as a new valid movement track, and outputs an instruction to start the processing to the passage determining unit 206.

When the candidate movement track is set as the new valid movement track, the change processing unit 205 outputs an instruction to transmit route information to the route information transmitting unit 208.

When the instruction to start the processing is input from the track change determining unit 202 or the change processing unit 205, the passage determining unit 206 determines whether the vehicle L has reached the new transit point on the basis of the current position of the vehicle L with reference to the management information database 201. The passage determining unit 206 determines whether the vehicle L has reached the destination when it is determined that the vehicle L has reached the new transit point, and outputs an instruction to start the processing to the update processing unit 207 when it is determined that the vehicle L has not reached the destination. In the first embodiment of the invention, when it is determined that the vehicle L has reached the destination, the passage determining unit 206 does not do anything in particular.

On the other hand, when it is determined that the vehicle L has not reached the new transit point, the passage determining unit 206 outputs an instruction to continue the processing to the track change determining unit 202.

When the instruction to start the processing is input from the passage determining unit 206, the update processing unit 207 updates the valid movement track stored in the management information database 201. Specifically, the passage determining unit 206 overwrites and stores the valid movement track from which the transit point has been deleted in the management information database 201 and outputs an instruction to continue the processing to the track change determining unit 202.

The route information transmitting unit 208 transmits route information including information of a valid movement track from the departure point to the destination to the vehicle L to initially set the valid movement track in the vehicle L. After initially setting the valid movement track, the route information transmitting unit 208 transmits route information including information of a valid movement track along which the vehicle L has to travel with reference to the management information database 201 when the valid movement track set in the vehicle L needs to be changed and an instruction to transmit route information is input from the change processing unit 205. The route information transmitting unit 208 may transmit route information every predetermined time (for example, every 10 seconds) with reference to the management information database 201.

The movable object information receiving unit 209 receives movable object information including information of a position, a moving speed, and a moving direction from each vehicle L and updates the current position, the current moving speed, and the current moving direction of the vehicle L in the management information database 201.

An operation of a vehicle L according to the first embodiment of the invention will be described below.

The position measuring unit L02 of the vehicle L periodically measures a position, a moving speed, and a moving direction of the vehicle L. The information transmitting unit L01 periodically transmits movable object information including information of the measured position, the measured moving speed, and the measured moving direction to the movable object managing device 200. The traveling control unit L04 controls the moving speed and the steering of the vehicle L such that the vehicle L travels on the set valid movement track without departing from a predetermined allowable range on the basis of the measured position, the measured moving speed, and the measured moving direction of the vehicle L. For example, the traveling control unit L04 controls the moving speed and the steering in the following sequence.

First, the traveling control unit L04 calculates a time at which the vehicle L has to start deceleration to stop at a boundary of the allowable range in the moving direction (an in-range deceleration time) on the basis of the position, the moving speed, and the moving direction of the vehicle L. When the in-range deceleration time is before the current time, the traveling control unit L04 decelerates the vehicle L to a moving speed at which the vehicle can stop at the boundary of the allowable range. On the other hand, when the in-range deceleration time is after the current time, the traveling control unit L04 calculates a time at which the vehicle L has to start deceleration for a left turn or right turn in the route or for stopping at the terminus of the route (a route deceleration time). When the route deceleration time is before the current time, the traveling control unit L04 decelerates the vehicle L to a moving speed at which a left turn or right turn is possible or a moving speed at which the vehicle can stop. On the other hand, when the route deceleration time is after the current time, the traveling control unit L04 accelerates the vehicle L such that the moving speed of the vehicle L reaches a maximum speed, or maintains the moving speed.

When the position of the vehicle L approaches a left-turn or right-turn point of the route, the traveling control unit L04 determines whether the moving speed of the vehicle L is a moving speed at which a left turn or right turn is possible. When the moving speed is a moving speed at which a left turn or right turn is possible, the traveling control unit L04 controls the steering in accordance with the route. On the other hand, when the moving speed is not a moving speed at which a left turn or right turn is possible, the traveling control unit L04 controls the moving speed and the steering of the vehicle L such that the vehicle stops in the allowable range.

At this time, the traveling control unit L04 may control traveling such that the risk is avoided by another function mounted in the vehicle L as well as determination of whether the current position is in the allowable range. In this case, the traveling control unit L04 controls the traveling such that the vehicle L departs from the allowable range. When the vehicle L departs from the allowable range, the traveling control unit L04 stops the vehicle L.

When route information including information of a new valid movement track is received from the movable object managing device 200, the vehicle L resets the set valid movement track to the new valid movement track. The traveling control unit L04 controls the moving speed and the steering such that the vehicle travels on the new valid movement track. Accordingly, for example, when an obstacle occurs in the road 13 and movement of the vehicle L along the set valid movement track is impossible or difficult, the vehicle L can travel on the new valid movement track for avoiding the obstacle.

Figure 4:
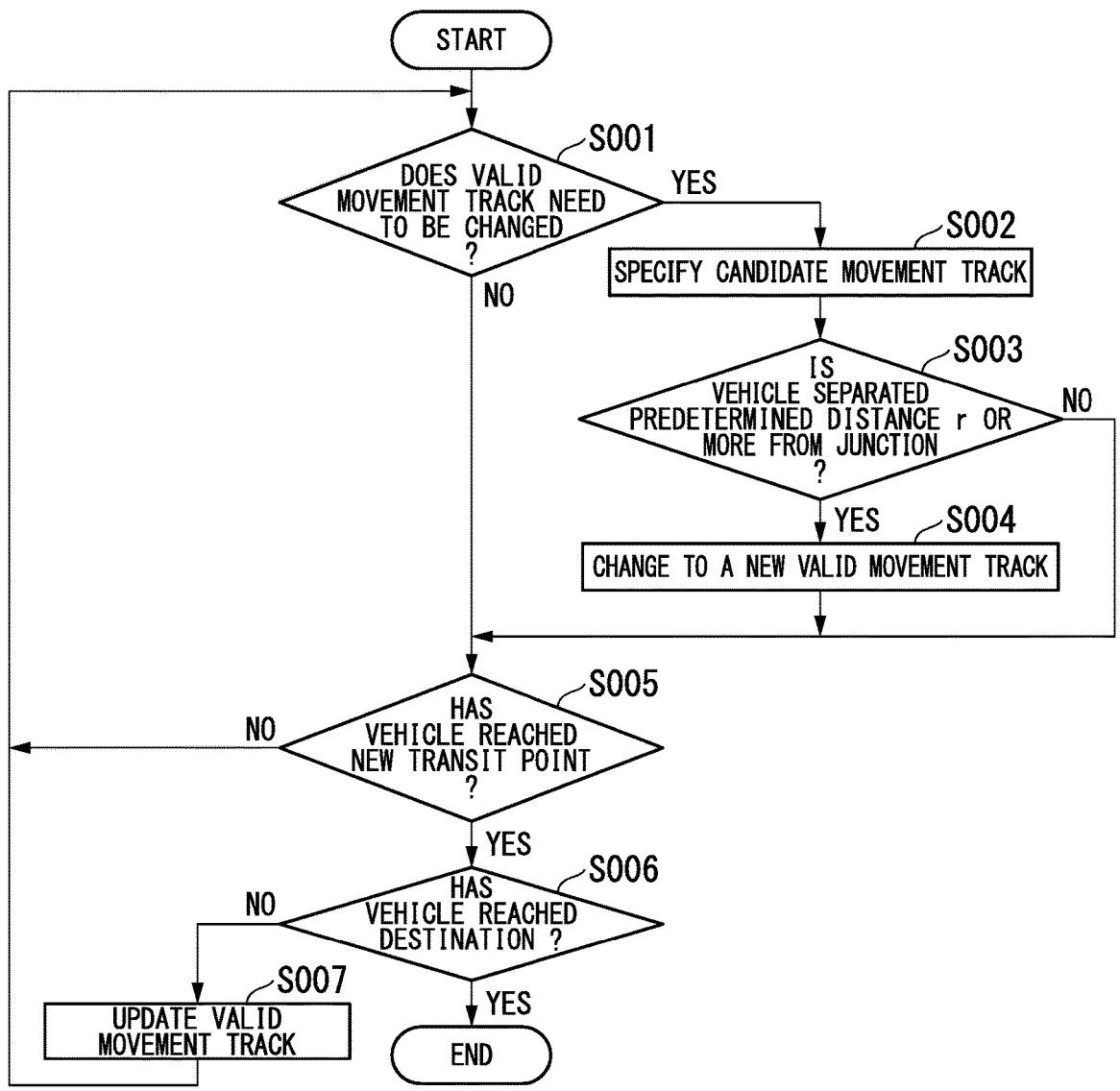
FIG. 4 is a flowchart illustrating operations of the movable object managing device according to the first embodiment.
Figure 5A:
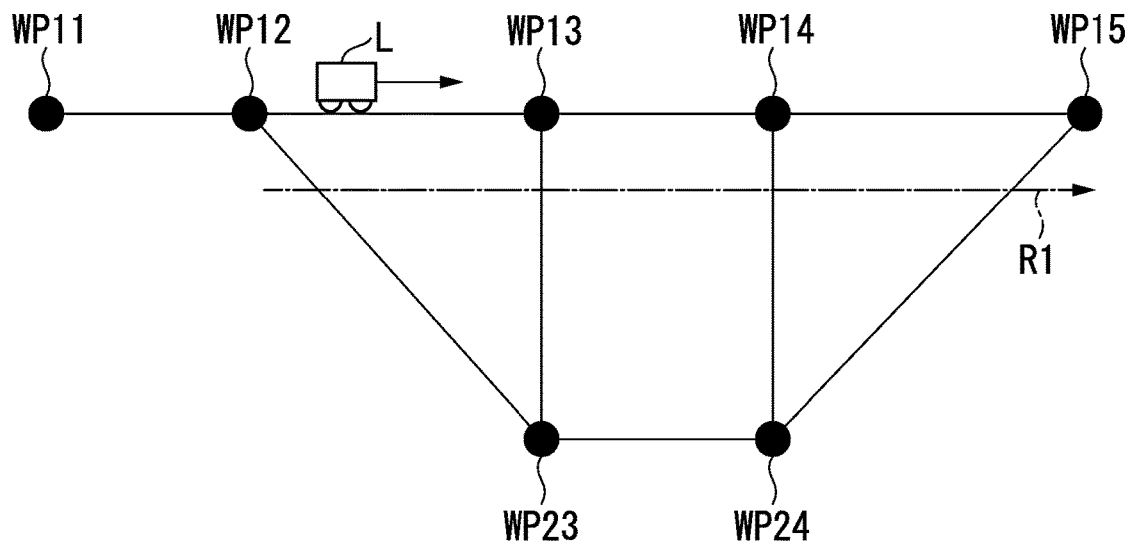
FIG. 5A is a diagram schematically illustrating an operation of a vehicle according to the first embodiment.
Figure 5B:
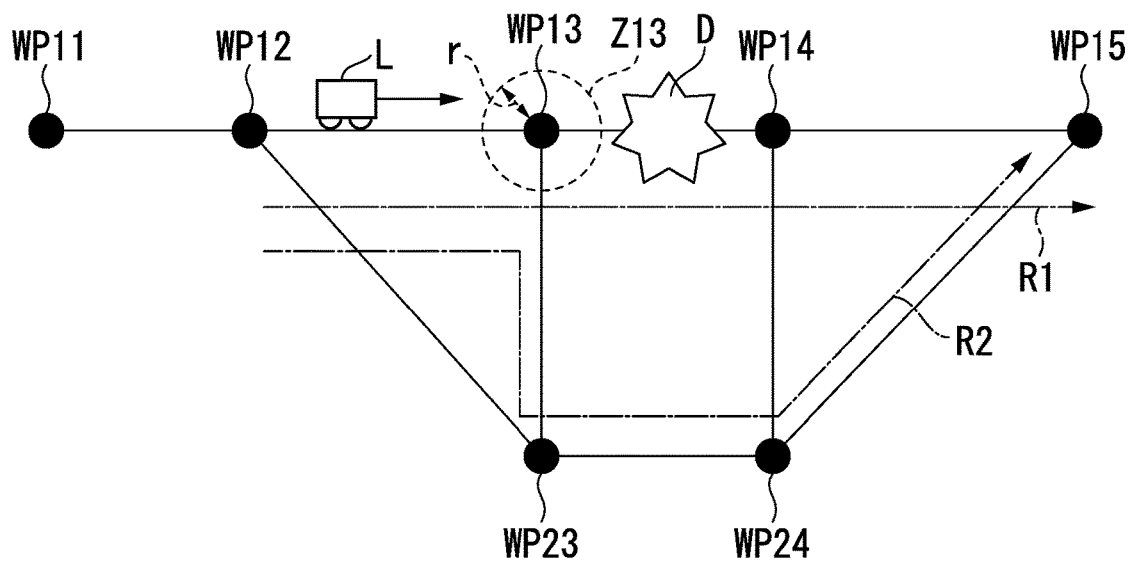
FIG. 5B is a diagram schematically illustrating an operation of a vehicle according to the first embodiment.
Figure 5C:
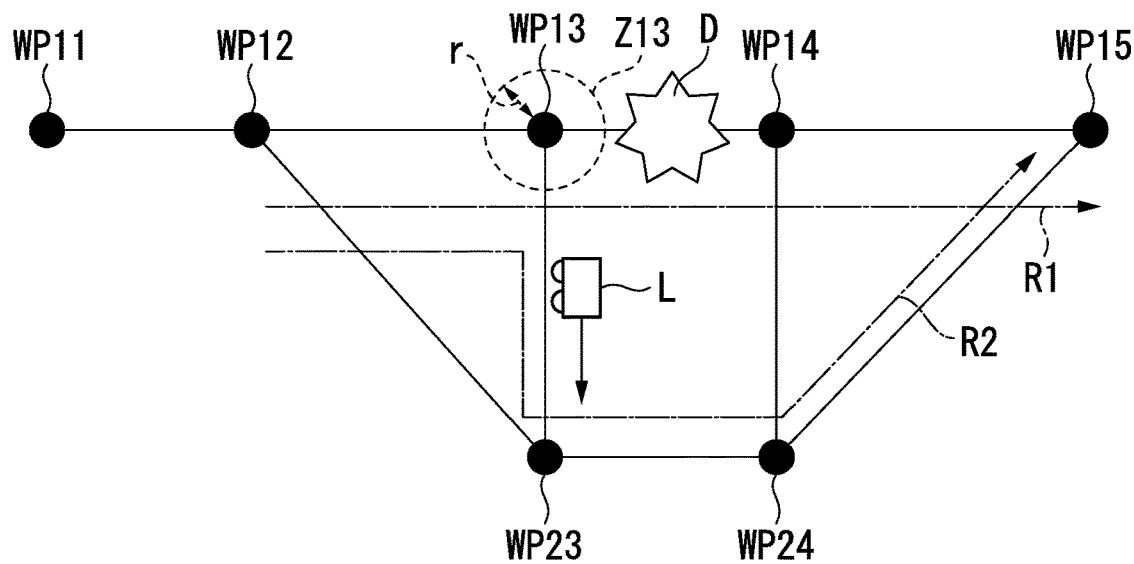
FIG. 5C is a diagram schematically illustrating an operation of a vehicle according to the first embodiment.

FIG. 4 is a flowchart illustrating a movement track changing process of the movable object managing device according to the first embodiment. FIGS. 5A to 5C simplify and illustrate some of transit points which are virtually set at predetermined positions of intersections on the roads 13 illustrated in FIG. 1 and are diagrams schematically illustrating the operation of the vehicle according to the first embodiment. Since FIG. 1 is a schematic diagram, the positions and the number of the roads 13, the positions and number of the intersections, and the like in FIG. 1 do not correspond to those in FIGS. 5A to 5C.

In the first embodiment of the invention, transit point information including the positions of the transit points which are virtually set in advance at the predetermined positions of the intersections on the roads 13 is stored in the management information database 201, but the transit point information may be set later or settings thereof may be changed if necessary.

In FIGS. 5A to 5C, transit points WP11 to WP15, WP23, and WP24 are virtually set at intersections on the roads 13 from the transit point WP11 corresponding to the gate 111 which is a departure point of the vehicle L to the transit point WP15 corresponding to the waiting area 12 which is a destination. In FIGS. 5A to 5C, the transit points WP12, WP13, WP14, and WP15 are included in a valid movement track R1 set in the vehicle L. The current position of the vehicle L is located between the transit points WP12 and WP13. FIG. 5B illustrates a state in which an obstacle D such as an accident has occurred between the transit points WP13 and WP14 immediately after the state illustrated in FIG. 5A and passage between the transit points WP13 and WP14 is not possible.

A movement track changing process of the movable object managing device 200 will be described below with reference to the flowchart illustrated in FIG. 4. The movable object managing device 200 starts the movement track changing process when a valid movement track from a departure point to a destination is initially set in the vehicle L. For example, the movement track changing process may be started at a time at which the movable object managing device 200 transmits route information including information of an initial-setting valid movement track from a departure point to a destination to the vehicle L. For example, the information of the valid movement track which is initially set in the vehicle L may be prepared by a schedule managing unit (not illustrated) that manages all schedules of a plurality of vehicles L on the basis of current positions (departure points) of the plurality of vehicles L and positions (destinations) of the waiting areas 12 in which a transportation machine F waits and may be transmitted from the route information transmitting unit 208 to the vehicle L. The schedule managing unit (not illustrated) may store the transmitted information of the valid movement track as valid movement track information on the valid movement track set in the vehicle L in the management information database 201.

When the movement track changing process is started, the track change determining unit 202 of the movable object managing device 200 determines whether the valid movement track R1 set in the vehicle L needs to be changed (Step S001).

For example, when an obstacle occurs, an obstacle occurrence notifying unit (not illustrated) may store information of an obstacle occurrence position in the management information database 201. In this case, the track change determining unit 202 may determine whether the valid movement track R1 set in the vehicle L needs to be changed as follows. First, the track change determining unit 202 acquires movable object information of the vehicle L, valid movement track information, transit point information, and information of obstacle occurrence position with reference to the management information database 201. When there is no information of an obstacle occurrence position, the track change determining unit 202 may determine that the valid movement track R1 set in the vehicle L does not need to be changed (NO in Step S001).

When there is information of an obstacle occurrence position, the track change determining unit 202 specifies a set of transit points between which a vehicle cannot pass due to an obstacle on the basis of the information of an obstacle occurrence position and the transit point information. In the example illustrated in FIG. 5B, the transit points WP13 and WP14 are specified as the set of transit points between which a vehicle cannot pass due to the obstacle D. Then, it is determined whether the specified set of transit points is continuously included in the valid movement track information set in advance in the vehicle L. When it is determined that the specified set of transit points is continuously included in the valid movement track information, the track change determining unit 202 determines that the valid movement track set in the vehicle L needs to be changed (YES in Step S001). On the other hand, when at least a part of the specified set of transit points is not included or is not continuously included, the track change determining unit 202 determines that the valid movement track R1 set in the vehicle L does not need to be changed (NO in Step S001). For the purpose of simplification of the processing, when it is determined that the current position of the vehicle L is located between the transit points of the specified set on the basis of the position information of the vehicle L, it may be determined that the valid movement track R1 set in the vehicle L does not need to be changed.

For example, in the example illustrated in FIG. 5B, the track change determining unit 202 determines that the transit points WP13 and WP14 in the specified set of transit points are continuously included in the valid movement track information R1 set in advance in the vehicle L. Accordingly, the track change determining unit 202 determines that the valid movement track R1 set in the vehicle L needs to be changed (YES in Step S001) and outputs the determination result to the candidate track specifying unit 203. On the other hand, when it is determined that the transit points included in the valid movement track set in the vehicle L do not need to be changed (NO in Step S001), the track change determining unit 202 inputs an instruction to start the processing to the passage determining unit 206.

When the track change determining unit 202 determines that the valid movement track R1 set in the vehicle L needs to be changed and the determination result is input from the track change determining unit 202, the candidate track specifying unit 203 of the movable object managing device 200 specifies a candidate movement track which is a movement track other than the valid movement track R1 with reference to the management information database 201 (Step S002).

For example, in the example illustrated in FIG. 5B, the candidate track specifying unit 203 acquires transit point information, information of an obstacle occurrence position, and the like with reference to the management information database 201 and specifies a candidate movement track not including a section between the transit points WP13 and WP14 in which the obstacle D occurs on the basis of the information. For example, the candidate track specifying unit 203 may specify a movement track, which is a shortest route from the current position of the vehicle L to the transit point WP15 that is the destination among movement tracks not including the section between the transit points WP13 and WP14 in which the obstacle D occurs, as a candidate movement track. For example, in the example illustrated in FIG. 5B, the candidate track specifying unit 203 specifies a candidate movement track R2 which is a movement track as a candidate to be changed other than the valid movement track R1 set in the vehicle L. The candidate track specifying unit 203 may specify two or more candidate movement tracks. The candidate track specifying unit 203 outputs the specified candidate movement track R2 to the movable object position determining unit 204. The candidate track specifying unit 203 may store information of the specified candidate movement track R2 in the management information database 201.

When the candidate movement track specified by the candidate track specifying unit 203 is input, the movable object position determining unit 204 of the movable object managing device 200 acquires movable object information of the vehicle L, valid movement track information, transit point information, and the like with reference to the management information database 201 and determines whether the current position of the vehicle L is separated a predetermined distance r or more from the transit point serving as a junction between the valid movement track set in advance in the vehicle L and the specified candidate movement track on the basis of the acquired information (Step S003). For example, in the example illustrated in FIG. 5B, the transit point serving as a junction between the valid movement track R1 set in the vehicle L and the candidate movement track R2 is the transit point WP13. As described above, the movable object position determining unit 204 may specify the transit point WP13 serving as a junction as a final transit point which is common to both the valid movement track R1 and the candidate movement track R2 when the candidate movement track R2 is traced in the moving direction of the vehicle L from the current position of the vehicle L on the basis of the movable object information, the valid movement track information, the transit point information, and the like of the vehicle L acquired with reference to the management information database 201. A transit point located forward (in the moving direction) from the transit point WP13 serving as a junction is the transit point WP14 for the valid movement track R1 and is the transit point WP23 for the candidate movement track R2, which are different from each other.

In FIG. 5B, for the purpose of visually easy understanding, a circle Z13 with the transit point WP13 serving as a junction as a center and with a predetermined distance r as a radius is illustrated. In the example illustrated in FIG. 5B, the current position of the vehicle L is located outside the circle Z13 and is thus separated the predetermined distance r or more from the transit point WP13 serving as a junction. For example, in the example illustrated in FIG. 5B, the movable object position determining unit 204 calculates an actual distance between the current position of the vehicle L and the transit point WP13 serving as a junction on the basis of the movable object information of the vehicle L and the transit point information, determines that the current position of the vehicle L is separated the predetermined distance r or more from the transit point WP13 serving as a junction between the valid movement track R1 set in advance in the vehicle L and the specified candidate movement track R2 (YES in Step S003) because the actual distance is larger than the predetermined distance r, and outputs the determination result to the change processing unit 205.

Figure 6:
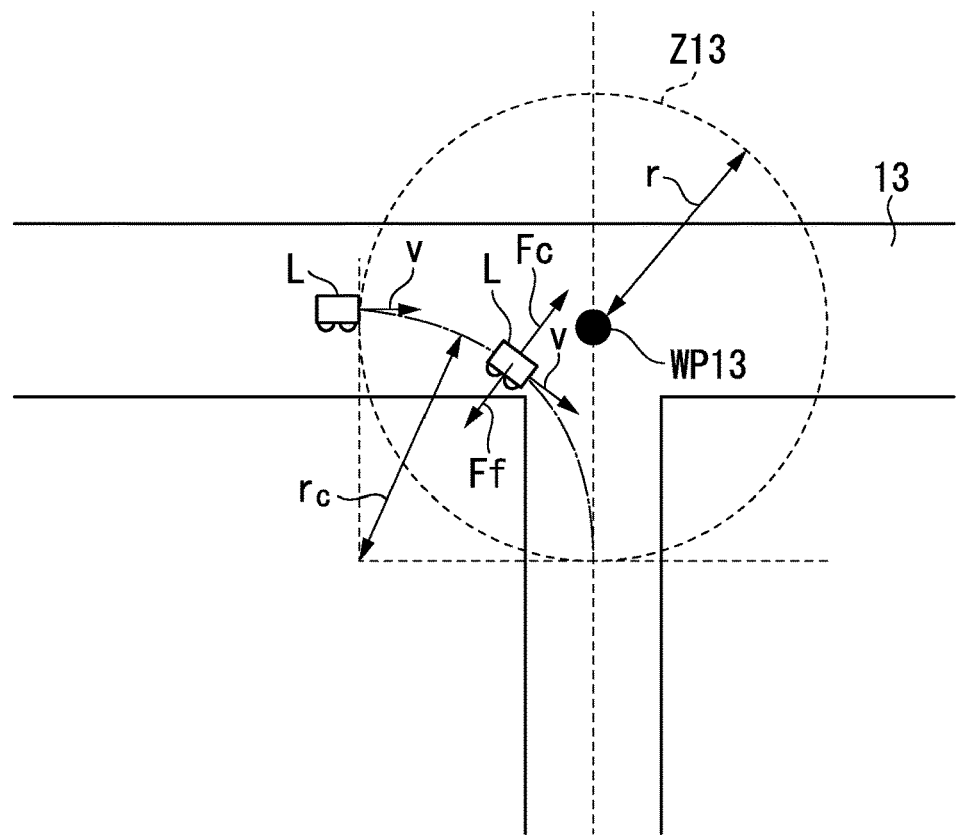
FIG. 6 is a diagram illustrating a predetermined distance according to the first embodiment.

FIG. 6 is a diagram illustrating the predetermined distance in the first embodiment.

The predetermined distance r may be defined as a distance which the vehicle L passing through the transit point serving as a junction can travel without being stopped in advance. The predetermined distance r may be defined as a value based on the current moving speed of the vehicle L in advance. For example, as illustrated in FIG. 6, the predetermined distance r may be set to a value of a minimum radius of curvature at which the vehicle L does not skid even when the vehicle L changes its moving direction with the current moving speed kept and moves in a curved way of right turn or left turn. In the example illustrated in FIG. 6, the minimum radius of curvature rc [m] is calculated as follows on the basis of the mass m [kg] of the vehicle L, the moving speed v [km/h] of the vehicle L, the frictional coefficient μ of the road 13, and the gravitational acceleration g [m/s$^2$]. First, a centrifugal force Fc of the vehicle L is calculated by the following equation.

$$Fc=mv^2/rc$$

A frictional force Ff of the vehicle L is calculated by the following equation.

$$Ff=\mu mg$$

The radius of curvature rc in which the vehicle L does not skid at the moving speed v is calculated as follows when the centrifugal force Fc is equal to the frictional force Ff.

$$Fc=Ff$$

$$mv^2/rc=\mu mg$$

$$rc=mv^2/\mu mg=v^2/\mu g$$

Accordingly, in the example illustrated in FIG. 6, the predetermined distance r is defined as the radius of curvature rc($=v^2/\mu g$) in advance.

The predetermined distance r may be defined as a value other than the value of the minimum radius of curvature in advance. The predetermined distance r may be calculated by a predetermined equation on the basis of the current moving speed of the vehicle L or may be a fixed value.

On the other hand, when the current position of the vehicle L is not separated the predetermined distance r or more from the transit point WP13 serving as a junction, the movable object position determining unit 204 determines that the current position of the vehicle L is not separated the predetermined distance r or more from the transit point WP13 serving as a junction (NO in Step S003) and outputs the determination result to the passage determining unit 206. When it is determined that the current position of the vehicle L is not separated the predetermined distance r or more from the transit point WP13 serving as a junction and another transit point serving as a new junction is present between the transit point WP13 and the obstacle D or a new transit point can be additionally set, a candidate movement track in which the other transit point or the new transit point serves as a new junction can be specified and can be set as a new valid movement track by performing the processing in accordance with the flow illustrated in FIG. 4 (for example, by performing the processing through NO in Step S003, YES in Step S005, NO in Step S006, Step S007, YES in Step S001, Step S002, and YES in Step S003).

However, as illustrated in FIG. 5B, when another transit point serving as a new junction is not present between the transit point WP13 and the obstacle D or when a new transit point cannot be additionally set, for example, the vehicle L may be caused to return to a position which is separated the predetermined distance r or more from the transit point WP13 serving as a junction in a direction opposite to the moving direction. In this case, the determination result indicating that "the current position of the vehicle L is separated the predetermined distance r or more from the transit point WP13 serving as a junction" may be output to the passage determining unit 206 and the candidate movement track in which the transit point WP13 serves as a junction may be set as a new valid movement track by performing the next step (Step S004).

When the determination result indicating that the current position of the vehicle L is separated the predetermined distance r or more from the transit point serving as a junction is input from the movable object position determining unit 204, the change processing unit 205 of the movable object managing device 200 sets the candidate movement track specified in Step S002 as a new valid movement track (Step S004) and inputs an instruction to start the processing to the passage determining unit 206. Specifically, the change processing unit 205 acquires information of the candidate movement track with reference to the management information database 201, stores the acquired candidate movement track as a new valid movement track in the management information database 201 to overwrite the valid movement track information, and changes the candidate movement track as a new valid movement track by inputting an instruction to transmit route information to the route information transmitting unit 208. For example, in the example illustrated in FIG. 5B, the change processing unit 205 overwrites and stores the specified candidate movement track R2 as a valid movement track in the management information database 201, changes the valid movement track R1 to the new valid movement track R2, and inputs an instruction to transmit route information to the route information transmitting unit 208.

The route information transmitting unit 208 having received the instruction to transmit route information from the change processing unit 205 acquires valid movement track information with reference to the management information database 201 and transmits route information including information of the new valid movement track R2 to the vehicle L. When the route information including the information of the new valid movement track R2 is received from the movable object managing device 200 by the information receiving unit L01 of the vehicle L, the traveling control unit L04 of the vehicle L controls traveling of the vehicle L such that the vehicle L travels to the destination WP15 along the new valid movement track R2 on the basis of the route information including the information of the new valid movement track R2. That is, the valid movement track of the vehicle L is set to the new valid movement track R2.

When an instruction to start the processing is input from the track change determining unit 202 or the change processing unit 205, the passage determining unit 206 of the movable object managing device 200 acquires the movable object information of the vehicle L, the valid movement track information, the transit point information, and the like with reference to the management information database 201 and determines whether the current position of the vehicle L has reached the new transit point on the basis of the acquired information (Step S005). For example, in the example illustrated in FIG. 5C, the vehicle L moves along the new valid movement track R2 and has already passed through the new transit point WP13. Accordingly, the passage determining unit 206 acquires the movable object information of the vehicle L, the valid movement track information, the transit point information, and the like with reference to the management information database 201, compares the current position of the vehicle L based on the position information of the vehicle L included in the movable object information of the vehicle L with the positions of the transit points included in the valid movement track R2 set in the vehicle L, and determines that the vehicle L has already reached the new transit point WP13 (YES in Step S005). On the other hand, when the passage determining unit 206 determines that the vehicle L has not reached the new transit point as the result of comparison (NO in Step S005), the passage determining unit 206 outputs an instruction to continue the processing to the track change determining unit 202.

When it is determined that the vehicle L has already reached the new transit point WP13, the passage determining unit 206 determines whether the vehicle L has reached the destination (Step S006). For example, in the example illustrated in FIG. 5C, the passage determining unit 206 compares the current position of the vehicle L with the position of the transit point WP15 that is the destination on the basis of the movable object information of the vehicle L, the valid movement track information, the transit point information, and the like, determines that the vehicle L has not reached the transit point WP15 as the destination (NO in Step S006) because both positions are different from each other, and outputs an instruction to start the processing to the update processing unit 207.

On the other hand, when both positions are the same as the result of comparison between the current position of the vehicle L and the position of the transit point WP15 as the destination, the passage determining unit 206 determines that the vehicle L has reached the transit point WP15 as the destination (YES in Step S006) and ends the movement track changing process of the movable object managing device 200.

When the instruction to start the processing is input from the passage determining unit 206, the update processing unit 207 of the movable object managing device 200 updates the valid movement track stored in the management information database 201 (Step S007). For example, in the example illustrated in FIG. 5C, since the vehicle L moving along the new valid movement track R2 has passed through the new transit point WP13, information of the transit point WP12 immediately previous to the transit point WP13 is deleted from the valid movement track information of the valid movement track R2 and is overwritten and stored in the management information database 201. For example, when the valid movement track information of the valid movement track R2 stored in the management information database includes information of the transit points including sequence information in the form of (WP12, WP13, WP23, WP24, WP15), the transit point WP12 immediately previous to the transit point WP13 is deleted and the valid movement track information including information of the transit points as (WP13, WP23, WP24, WP15) is overwritten in the management information database 201.

Then, the update processing unit 207 outputs an instruction to continue the processing to the track change determining unit 202.

When the instruction to continue the processing is input from the passage determining unit 206 or the update processing unit 207, the track change determining unit 202 of the movable object managing device 200 determines whether the valid movement track R1 set in the vehicle L needs to be changed again (Step S001). This determination sequence is the same as the determination sequence which is performed by the track change determining unit 202 when the movement track changing process is started as mentioned above. Thereafter, the movable object managing device 200 repeatedly performs the movement track changing process until the vehicle L reaches the transit point WP15 as the destination in accordance with the flowchart illustrated in FIG. 4.

While an embodiment of the invention has been described in detail with reference to the accompanying drawings, a specific configuration is not limited thereto and can be subjected to various changes in design and the like.

According to the first embodiment of the invention, when a valid movement track which is a movement track along which a vehicle L as a movable object to be managed is scheduled to move is changed, the movable object managing device 200 specifies a candidate movement track that is a candidate for change, determines whether a current position of the vehicle L is separated a predetermined distance or more from a transit point serving as a junction between the valid movement track set in the vehicle L and the candidate movement track, and changes the valid movement track of the vehicle L when it is determined that the current position of the vehicle L is separated the predetermined distance or more from the transit point serving as a junction. Accordingly, it is possible to prevent the vehicle L from causing an accident such as a failure in turning which results in a rollover when passing through the junction and to cause the vehicle L to safely travel to a destination. Even at a transit point close to the current position of the vehicle L, it is possible to check safety without temporarily stopping the vehicle L and to efficiently change the movement track.

Modified Example of First Embodiment

A modified example of the first embodiment of the invention will be described below.

Figure 7:
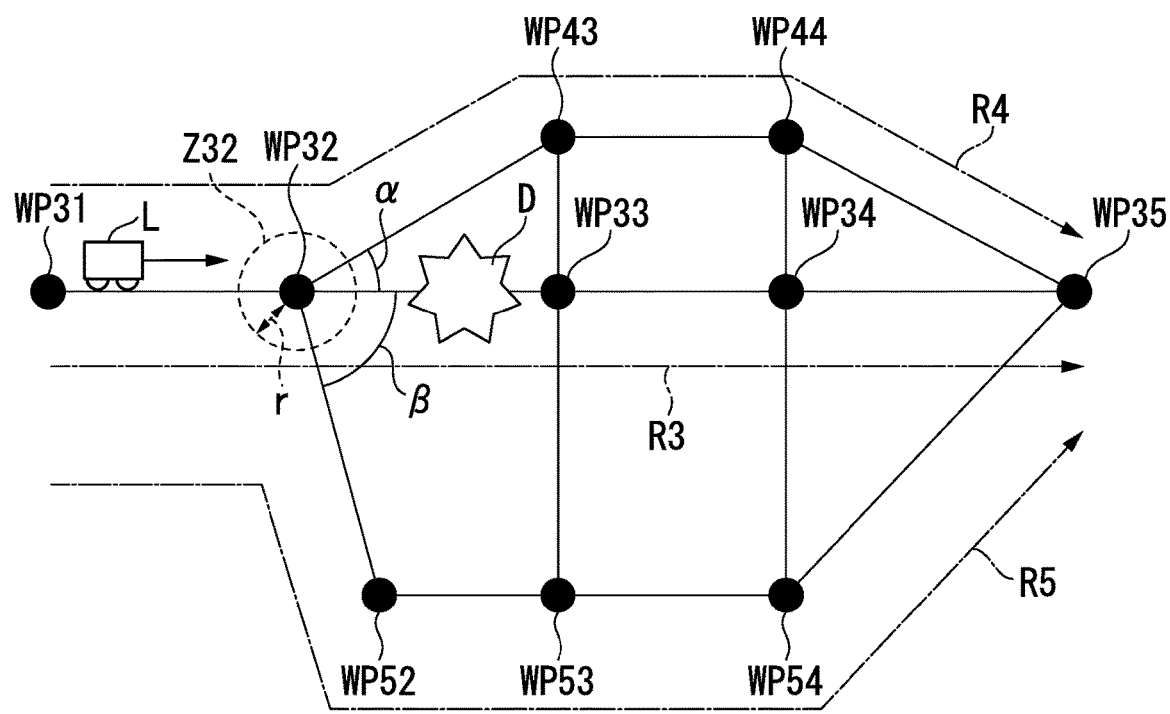
FIG. 7 is a diagram schematically illustrating an operation of a vehicle according to a modified example of the first embodiment.

FIG. 7 is a diagram schematically illustrating a modified example of the first embodiment of the invention.

FIG. 7 is a diagram schematically illustrating an example in which transit points are virtually set for the intersections on the roads 13 illustrated in FIG. 1, similarly to the examples illustrated in FIGS. 5A to 5C. Since FIG. 1 is a schematic diagram, the positions and the number of the roads 13 and the positions and the number of the intersections are not the same in FIGS. 1 and 7.

Figure 8:
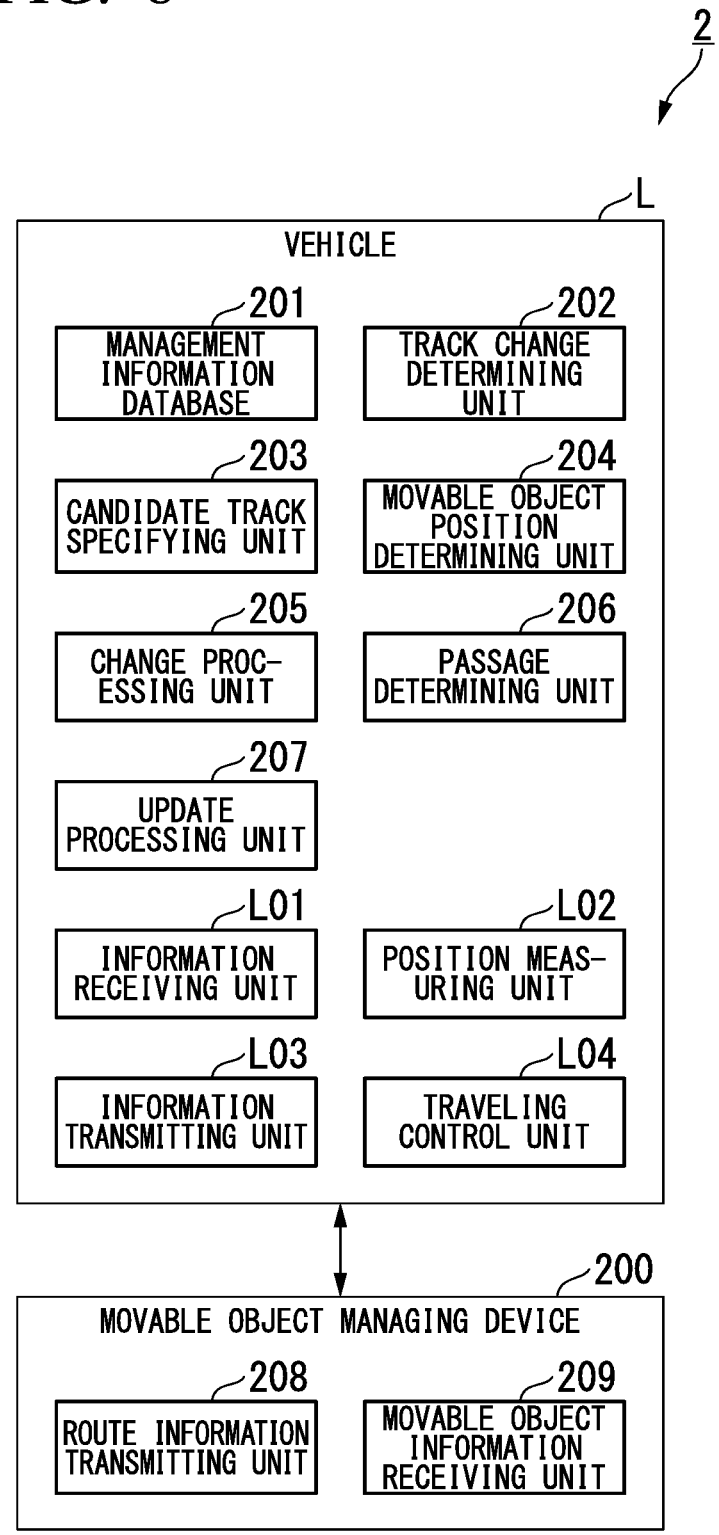
FIG. 8 is a block diagram schematically illustrating configurations of a movable object managing device and a vehicle according to a second embodiment.

In FIG. 7, transit points WP31 to WP35, WP43 to WP44, and WP52 to WP54 are virtually set for intersections on roads 13 from the transit point WP31 of a gate 111 as a departure point of the vehicle L to the transit point WP35 of a waiting area 12 as a destination. In FIG. 8, the transit points WP31, WP32, WP33, WP34, and WP35 are included in a valid movement track R1 set in the vehicle L. The current position of the vehicle L is located between the transit points WP31 and WP32. In FIG. 7, a state in which an obstacle D such as an accident occurs between the transit points WP32 and WP33 and traveling between the transit points WP32 and WP33 is not possible is illustrated. In FIG. 7, similarly to the example illustrated in FIG. 5B, a circle Z32 with the transit point WP32 serving as a junction as the center and with the predetermined distance r as the radius is illustrated for the purpose of visually easy understanding.

In the modified example of the first embodiment illustrated in FIG. 7, similarly to the first embodiment of the invention, the movable object managing device 200 performs the movement track changing process in accordance with the flowchart illustrated in FIG. 4 and the candidate track specifying unit 203 of the movable object managing device 200 specifies a candidate movement track which is a movement track other than a valid movement track R3 set in the vehicle L (Step S002). However, in the modified example illustrated in FIG. 7, unlike the first embodiment of the invention, not only one but two candidate movement tracks R4 and R5 are specified as candidates for movement tracks.

The candidate movement track R4 includes transit points WP31, WP32, WP43, WP44, and WP35, and the candidate movement track R5 includes transit points WP31, WP32, WP52, WP53, WP54, and WP35. Here, as illustrated in FIG. 7, when the vehicle L passes through the transit point WP32 serving as a junction and then moves to the transit point WP43 included in the candidate movement track R4, a change angle of the moving direction of the vehicle L is defined as $\alpha$. More specifically, when the valid movement track is changed to the candidate movement track R4 in FIG. 7, the moving direction of the vehicle L before being changed is a direction in which the transit point WP31 is straightly connected to the transit point WP32, and the moving direction of the vehicle L after being changed is a direction in which the transit point WP32 is straightly connected to the transit point WP43. In the example illustrated in FIG. 7, since the transit points WP31, WP32, and WP33 are located in a straight line, the change angle of the moving direction of the vehicle L is an angle $\alpha$ between the straight line connecting the transit points WP32 and WP33 and the straight line connecting the transit points WP32 and WP43.

On the other hand, when the vehicle L passes through the transit point WP32 serving as a junction and then moves to the transit point WP52 included in the candidate movement track R5, the change angle of the moving direction of the vehicle L is defined as $\beta$. More specifically, when the valid movement track is changed to the candidate movement track R5 in FIG. 7, the moving direction of the vehicle L before being changed is a direction in which the transit point WP31 is straightly connected to the transit point WP32, and the moving direction of the vehicle L after being changed is a direction in which the transit point WP32 is straightly connected to the transit point WP52. In the example illustrated in FIG. 7, since the transit points WP31, WP32, and WP33 are located in a straight line, the change angle of the moving direction of the vehicle L is an angle $\beta$ between the straight line connecting the transit points WP32 and WP33 and the straight line connecting the transit points WP32 and WP52.

As illustrated in FIG. 7, the angle $\beta$ is larger than the angle $\alpha$. In this case, when the determination result indicating that the current position of the vehicle L is separated the predetermined distance r or more from the transit point WP32 serving as a junction is input from the movable object position determining unit 204, the change processing unit 205 of the movable object managing device 200 acquires information of the candidate movement track, the transit point information, and the like with reference to the management information database 201, stores the candidate movement track R4 in which the change angle of the moving direction of the movable object at the junction is smaller among the two specified candidate movement tracks R4 and R5 as a new valid movement track in the management information database 201, and sets the candidate movement track R4 as a new valid movement track (Step S004).

For example, the change processing unit 205 may calculate the change angle α of the moving direction of the vehicle L with respect to the candidate movement track R4 at the transit point WP32 serving as a junction and the change angle β of the moving direction of the vehicle L with respect to the candidate movement track R5 on the basis of the position information of the transit points included in the acquired transit point information.

In the modified example of the first embodiment of the invention, when a plurality of candidate movement tracks are specified by the candidate track specifying unit 203, the change processing unit 205 sets the candidate movement track in which the change angle of the moving direction of the vehicle L at the junction is minimized as a new valid movement track. In the example illustrated in FIG. 7, the number of specified candidate movement tracks is two, but the candidate movement track in which the change angle of the moving direction of the vehicle L at the junction is minimized is set as a new valid movement track similarly when three or more candidate movement tracks are specified.

According to the modified example of the first embodiment, when a valid movement track which is a movement track along which a vehicle L as a movable object to be managed is scheduled to move is changed, the movable object managing device 200 sets a candidate movement track in which the change angle of the moving direction of the vehicle L is smaller as a new valid movement track. Accordingly, an optimal movement track in which the vehicle L can more safely turn at a junction between the movement track before being changed and the movement track after being changed and the vehicle L can more efficiently move without decreasing the speed at the time of turning can be selected from a plurality of candidate movement tracks to a destination.

Second Embodiment

A second embodiment of the invention will be described below.

FIG. 8 is a block diagram schematically illustrating a configuration of a vehicle and a movable object managing device in a control system according to the second embodiment of the invention. In FIG. 8, the same elements as the elements illustrated in FIG. 3 will be referred to by the same reference signs.

The control system 2 according to the second embodiment of the invention illustrated in FIG. 8 includes a plurality of vehicles L as movable objects and a movable object managing device 200 as a control device for the vehicles L, similarly to the control system 2 according to the first embodiment of the invention illustrated in FIG. 2.

However, in the control system 2 according to the second embodiment of the invention, each vehicle L includes the management information database 201, the track change determining unit 202, the candidate track specifying unit 203, the movable object position determining unit 204, the change processing unit 205, the passage determining unit 206, and the update processing unit 207 which are included in the movable object managing device 200 in the control system 2 according to the first embodiment of the invention.

A vehicle L according to the second embodiment of the invention includes an information receiving unit L01, a position measuring unit L02, an information transmitting unit L03, and a traveling control unit L04, similarly to the vehicle L according to the first embodiment of the invention.

The control system 2 according to the second embodiment illustrated in FIG. 8 is different from the control system 2 according to the first embodiment illustrated in FIG. 3 in the configurations of the movable object managing device and the vehicle. Specifically, in the second embodiment, unlike the first embodiment, the vehicle L instead of the movable object managing device 200 includes the management information database 201, the track change determining unit 202, the candidate track specifying unit 203, the movable object position determining unit 204, the change processing unit 205, the passage determining unit 206, and the update processing unit 207. The vehicle L according to the second embodiment of the invention includes the information receiving unit L01, the position measuring unit L02, the information transmitting unit L03, and the traveling control unit L04 similarly to the vehicle L according to the first embodiment.

On the other hand, the movable object managing device 200 according to the second embodiment of the invention includes a route information transmitting unit 208 and a movable object information receiving unit 209.

In the control system 2 according to the second embodiment of the invention, the route information transmitting unit 208 of the movable object managing device 200 is configured to transmit route information including information of a valid movement track from a departure point to a destination to the vehicle L to initially set the valid movement track in the vehicle L, to then receives obstacle occurrence notification information including information of an obstacle occurrence position from an obstacle occurrence notifying unit (not illustrated), and to transmit the received obstacle occurrence notification information to the vehicle L when occurrence of an obstacle is notified. When the obstacle occurrence notification information transmitted from the movable object managing device 200 is received, the information transmitting unit L03 of the vehicle L stores information of the obstacle occurrence position included in the obstacle occurrence notification information in the management information database 201.

The vehicle L starts a movement track changing process when the valid movement track from a departure point to a destination is initially set. The movement track changing process to be performed is the same as the process described above with reference to the flowchart illustrated in FIG. 4.

With the configuration according to the second embodiment, since the vehicle L instead of the movable object managing device 200 performs the movement track changing process, it is possible to minimize an amount of information which is transmitted and received between the movable object managing device 200 and the vehicle L. Since the movement track changing process is performed by the vehicle L including the position measuring unit L02 that measures the position, the moving speed, and the moving direction of the vehicle L, it is possible to perform the movement track changing process in consideration of the current position, the current moving speed, and the current moving direction of the vehicle L in more real time.

With the configuration according to the second embodiment, when a valid movement track which is a movement track along which a vehicle L is scheduled to move is changed, the vehicle L specifies a candidate movement track that is a candidate for change, determines whether a current position of the vehicle L is separated a predetermined distance or more from a transit point serving as a junction between the valid movement track set in the vehicle L and the candidate movement track, and changes the valid movement track of the vehicle L when it is determined that the current position of the vehicle L is separated the predetermined distance or more from the transit point serving as a junction. Accordingly, similarly to the first embodiment, it is possible to prevent the vehicle L from causing an accident such as a failure in turning which results in a rollover when passing through the junction and to cause the vehicle L to safely travel to a destination. Even at a transit point close to the current position of the vehicle L, it is possible to check safety without temporarily stopping the vehicle L and to efficiently change the movement track.

In the above-mentioned embodiments, the movable object is a vehicle L, but the movable object is not limited thereto in other embodiments. For example, the movable object may be another movable object such as a ship, an aircraft, or an underwater craft. In the above-mentioned embodiments, a plurality of transit points are virtually set at positions corresponding to intersections on roads on the ground which is a two-dimensional space, but other embodiments are not limited thereto. A plurality of transit points may be virtually set at arbitrary positions on the ground which is a two-dimensional space. Further, for example, a plurality of transit points may also be virtually set at arbitrary positions in a three-dimensional space. Specifically, a plurality of transit points may be virtually set in the water, in the sky, in the outer space, and in a space in which such spaces are mixed.

In the above-mentioned embodiments, a vehicle L as a movable object moves by automatic driving, but a movable object in other embodiments is not limited thereto and a movable object may move by a human driver's manual driving. For example, in the control system 2 according to the second embodiment, a car navigation device included in a vehicle L which is driven by a human driver may include the management information database 201, the track change determining unit 202, the candidate track specifying unit 203, the movable object position determining unit 204, the change processing unit 205, the passage determining unit 206, and the update processing unit 207. In this case, the car navigation device may perform the movement track changing process, and the change processing unit 205 may display a new valid movement track on a monitor to guide the driver to a changed route to a destination when a candidate movement track is set as the new valid movement track.

In the above-mentioned embodiments, when an obstacle such as an accident occurs, it is determined that a valid movement track set in a movable object needs to be changed to avoid the obstacle, but other embodiments are not limited thereto. For example, when passage of a movable object is temporarily impossible or difficult due to movement of an aircraft in an airport or the like, when a destination of a movable object has been changed, when it is intended to avoid congestion (it is intended to relax congestion), when a movable object change an observation point, when a movable object travels along a natural landform, or when it is desired to change a movement track on the basis of observation results up to now, it may be determined that a valid movement track set in the movable object needs to be changed if necessary. In this case, a flag indicating that the valid movement track needs to be changed may be set up by storing predetermined information in the management information database 201, or information indicating that the valid movement track needs to be changed may be directly input to the track change determining unit 202.

Figure 9:
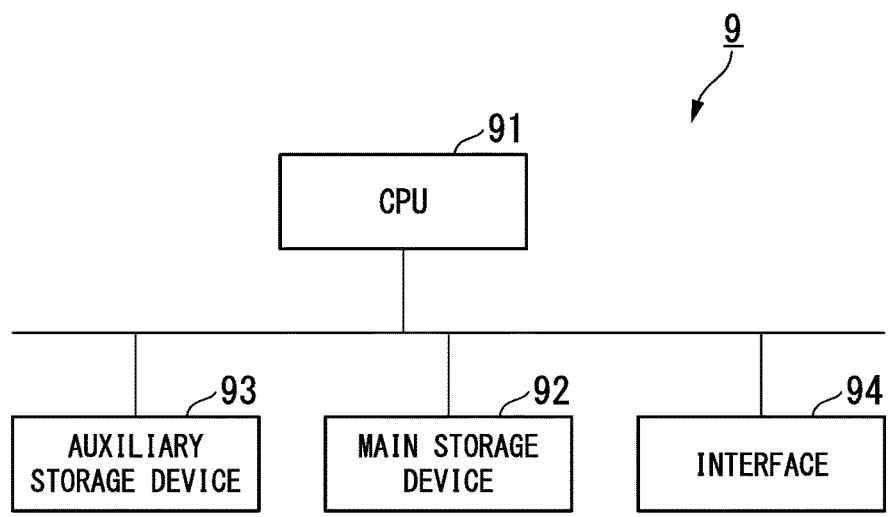
FIG. 9 is a block diagram schematically illustrating a configuration of a computer according to at least one embodiment.

FIG. 9 is a block diagram schematically illustrating a configuration of a computer according to at least one of the above-mentioned embodiments.

A computer 9 includes a CPU 91, a main storage device 92, an auxiliary storage device 93, and an interface 94.

The movable object managing device 200 and the vehicle L include the computer 9. The operations of the processing units are stored in the form of a program in the auxiliary storage device 93. The CPU 91 reads a program from the auxiliary storage device 93, loads the read program into the main storage device 92, and performs the processing in accordance with the program. For example, the track change determining unit 202, the candidate track specifying unit 203, the movable object position determining unit 204, the change processing unit 205, the passage determining unit 206, the update processing unit 207, and the traveling control unit L04 may be embodied by the CPU 91.

The CPU 91 secures a storage area corresponding to the database in the main storage device 92 or the auxiliary storage device 93 in accordance with the program. For example, the management information database 201 may be secured in the main storage device 92 or the auxiliary storage device 93.

For example, the route information transmitting unit 208, the movable object information receiving unit 209, the information receiving unit L01, the position measuring unit L02, and the information transmitting unit L03 may be provided as separate hardware (not illustrated).

Examples of the auxiliary storage device 93 include a hard disk drive (HDD), a solid state driver (SSD), a magnetic disk, a magneto-optical disc, a compact disc read only memory (CD-ROM), a digital versatile disc read only memory (DVD-ROM), and a semiconductor memory. The auxiliary storage device 93 may be an internal medium connected directly to a bus of the computer 9 or may be an external medium connected to the computer 9 via the interface 94 or a communication line. When the program is transmitted to the computer 9 via a communication line, the computer 9 having received the program may load the program into the main storage device 92 and perform the processing. In at least one of the above-mentioned embodiments, the auxiliary storage device 93 is a non-transistor tangible storage medium.

The program may be provided to realize some of the above-mentioned functions. The program may be a so-called differential file (a differential program) that realizes the above-mentioned functions in combination with other programs stored in the auxiliary storage device 93.

INDUSTRIAL APPLICABILITY

According to the control device for a movable object, it is possible to cause a movable object such as a vehicle moving along a movement track to a destination to safely and efficiently travel to the destination.

REFERENCE SIGNS LIST

1 Waiting facility
2 Control system

200 Movable object managing device
201 Management information database
202 Track change determining unit
203 Candidate track specifying unit
204 Movable object position determining unit
205 Change processing unit
206 Passage determining unit
207 Update processing unit
208 Route information transmitting unit
209 Movable object information receiving unit
D Obstacle
L Vehicle
L01 Information receiving unit
L02 Position measuring unit
L03 Information transmitting unit
L04 Traveling control unit
r Predetermined distance
R1 Set valid movement track
R2 to R5 Candidate movement track
WP Transit point
Z13, Z32 Circle
α, β Change angle

The invention claimed is:

1. A control device for a movable object moving along a movement track which is constituted by connecting a plurality of transit points set in a space, the control device comprising:
   a processor; and
   a non-transitory computer-readable medium having stored thereon executable instructions that, when executed by the processor, cause the control device to function as:
   a track change determining unit that is configured to determine whether a valid movement track which is the movement track along which the movable object is scheduled to move needs to be changed;
   a candidate track specifying unit that is configured to specify a candidate movement track which is the movement track other than the valid movement track when the track change determining unit determines that the valid movement track needs to be changed;
   a movable object position determining unit that is configured to determine whether a current position of the movable object is separated a predetermined distance or more from a transit point which is a junction between the valid movement track and the candidate movement track;
   a change processing unit that is configured to change the candidate movement track as a new valid movement track when the movable object position determining unit determines that the current position of the movable object is separated the predetermined distance or more from the transit point serving as the junction; and
   a route information transmitting unit that is configured to transmit, to the movable object, route information including information of the valid movement track for controlling turning of the movable object based on the route information,
   wherein:
   the predetermined distance is defined as a radius of curvature at which the movable object does not skid at the junction;
   the predetermined distance is defined as a minimum distance that the movable object passing through the transit point serving as the junction is able to turn without stopping based on a moving state of the movable object; and
   the change processing unit is configured to change the candidate movement track in which a change angle of a moving direction of the movable object at the junction is minimized as a new valid movement track when a plurality of candidate movement tracks are specified by the candidate track specifying unit.

2. The control device according to claim 1, wherein the executable instructions, when executed by the processor, cause the control device to further function as an update processing unit that is configured to update the valid movement track when the movable object has reached the transit point of the valid movement track and the movable object has not reached a destination.

3. The control device according to claim 2, wherein the track change determining unit is configured to determine whether the valid movement track needs to be changed again when the valid movement track has been updated.

4. The control device according to claim 1, wherein the predetermined distance is defined as a value based on a current moving speed of the movable object.

5. The control device according to claim 1, wherein the movable object is a vehicle.

6. The control device according to claim 1, wherein the movable object is a ship.

7. The control device according to claim 1, wherein the movable object is an aircraft.

8. The control device according to claim 1, wherein the movable object is an underwater craft.

9. The control device according to claim 1, wherein the radius of curvature is calculated based on a mass of the movable object, a moving speed of the movable object, and a frictional coefficient of a road.

10. A control system comprising:
    a control device for a movable object moving along a movement track which is constituted by connecting a plurality of transit points set in a space; and
    the movable object,
    wherein the control device includes:
    a processor; and
    a non-transitory computer-readable medium having stored thereon executable instructions that, when executed by the processor of the control device, cause the control device to function as:
    a track change determining unit that is configured to determine whether a valid movement track which is the movement track along which the movable object is scheduled to move needs to be changed;
    a candidate track specifying unit that is configured to specify a candidate movement track which is the movement track other than the valid movement track when the track change determining unit determines that the valid movement track needs to be changed;
    a movable object position determining unit that is configured to determine whether a current position of the movable object is separated a predetermined distance or more from a transit point which is a junction between the valid movement track and the candidate movement track;
    a change processing unit that is configured to change the candidate movement track as a new valid movement track when the movable object position determining unit determines that the current position of the movable object is separated the predetermined distance or more from the transit point serving as the junction;
    a movable object information receiving unit that is configured to receive, from the movable object, movable object information of the movable object including position information of the movable object, speed information of the movable object, and moving direction information of the movable object; and
a route information transmitting unit that is configured to transmit, to the movable object, route information including information of the valid movement track, and
wherein the movable object includes:
a processor; and
a non-transitory computer-readable medium having stored thereon executable instructions that, when executed by the processor of the movable object, cause the movable object to function as:
an information transmitting unit that is configured to transmit the movable object information to the control device;
an information receiving unit that is configured to receive the route information from the control device; and
a traveling control unit that is configured to control turning of the movable object based on the route information which has been received,
wherein:
the predetermined distance is defined as a radius of curvature at which the movable object does not skid at the junction;
the predetermined distance is defined as a minimum distance that the movable object passing through the transit point serving as the junction is able to turn without stopping based on a moving state of the movable object; and
the change processing unit is configured to change the candidate movement track in which a change angle of a moving direction of the movable object at the junction is minimized as a new valid movement track when a plurality of candidate movement tracks are specified by the candidate track specifying unit.

11. A movable object comprising:
a control device for the movable object moving along a movement track which is constituted by connecting a plurality of transit points set in a space,
wherein the control device includes:
a processor; and
a non-transitory computer-readable medium having stored thereon executable instructions that, when executed by the processor, cause the control device to function as:
a track change determining unit that is configured to determine whether a valid movement track which is the movement track along which the movable object is scheduled to move needs to be changed;
a candidate track specifying unit that is configured to specify a candidate movement track which is the movement track other than the valid movement track when the track change determining unit determines that the valid movement track needs to be changed;
a movable object position determining unit that is configured to determine whether a current position of the movable object is separated a predetermined distance or more from a transit point which is a junction between the valid movement track and the candidate movement track;
a change processing unit that is configured to change the candidate movement track as a new valid movement track when the movable object position determining unit determines that the current position of the movable object is separated the predetermined distance or more from the transit point serving as the junction; and
a traveling control unit that is configured to control turning of the movable object based on route information including information of the valid movement track,
wherein:
the predetermined distance is defined as a radius of curvature at which the movable object does not skid at the junction;
the predetermined distance is defined as a minimum distance that the movable object passing through the transit point serving as the junction is able to turn without stopping based on a moving state of the movable object; and
the change processing unit is configured to change the candidate movement track in which a change angle of a moving direction of the movable object at the junction is minimized as a new valid movement track when a plurality of candidate movement tracks are specified by the candidate track specifying unit.

12. A control method for a movable object moving along a movement track which is constituted by connecting a plurality of transit points set in a space, the control method comprising:
determining whether a valid movement track which is the movement track along which the movable object is scheduled to move needs to be changed;
specifying a candidate movement track which is the movement track other than the valid movement track upon determining that the valid movement track needs to be changed;
determining whether a current position of the movable object is separated a predetermined distance or more from a transit point which is a junction between the valid movement track and the candidate movement track;
changing the candidate movement track as a new valid movement track upon determining that the current position of the movable object is separated the predetermined distance or more from the transit point serving as the junction, wherein the candidate movement track in which a change angle of a moving direction of the movable object at the junction is minimized is changed as a new valid movement track when a plurality of candidate movement tracks are specified; and
transmitting, to the movable object, route information including information of the valid movement track for controlling turning of the movable object based on the route information,
wherein:
the predetermined distance is defined as a radius of curvature at which the movable object does not skid at the junction; and
the predetermined distance is defined as a minimum distance that the movable object passing through the transit point serving as the junction is able to turn without stopping based on a moving state of the movable object.

13. A non-transitory computer-readable medium having a program stored therein, the program causing a processor that is a control device for a movable object moving along a movement track which is constituted by connecting a plurality of transit points set in a space to function as:
a track change determining unit that is configured to determine whether a valid movement track which is the movement track along which the movable object is scheduled to move needs to be changed;
a candidate track specifying unit that is configured to specify a candidate movement track which is the movement track other than the valid movement track when the track change determining unit determines that the valid movement track needs to be changed;

a movable object position determining unit that is configured to determine whether a current position of the movable object is separated a predetermined distance or more from a transit point which is a junction between the valid movement track and the candidate movement track;

a change processing unit that is configured to change the candidate movement track as a new valid movement track when the movable object position determining unit determines that the current position of the movable object is separated the predetermined distance or more from the transit point serving as the junction; and a route information transmitting unit that is configured to transmit, to the movable object, route information including information of the valid movement track for controlling turning of the movable object based on the route information, wherein:

the predetermined distance is defined as a radius of curvature at which the movable object does not skid at the junction;

the predetermined distance is defined as a minimum distance that the movable object passing through the transit point serving as the junction is able to turn without stopping based on a moving state of the movable object; and the change processing unit is configured to change the candidate movement track in which a change angle of a moving direction of the movable object at the junction is minimized as a new valid movement track when a plurality of candidate movement tracks are specified by the candidate track specifying unit.

* * * * *